US009933199B2

United States Patent
Lukasse

(10) Patent No.: US 9,933,199 B2
(45) Date of Patent: Apr. 3, 2018

(54) METHOD OF DECIDING WHEN TO TERMINATE A DEFROSTING CYCLE WITHIN A REFRIGERATED CONTAINER

(71) Applicant: Maersk Line A/S, Copenhagen K (DK)

(72) Inventor: Leijn Johannes Sjerp Lukasse, Ede (NL)

(73) Assignee: Maersk Line A/S, Copenhagen K (DK)

(*) Notice: Subject to any disclaimer, the term of this patent is extended or adjusted under 35 U.S.C. 154(b) by 0 days.

(21) Appl. No.: 15/391,955

(22) Filed: Dec. 28, 2016

(65) Prior Publication Data

US 2017/0184333 A1   Jun. 29, 2017

(30) Foreign Application Priority Data

Dec. 29, 2015  (DK) .................................. 2015 70889

(51) Int. Cl.
*F25D 21/00*   (2006.01)
*F25D 11/00*   (2006.01)
(Continued)

(52) U.S. Cl.
CPC ......... *F25D 21/002* (2013.01); *B60H 1/3232* (2013.01); *F25D 11/003* (2013.01);
(Continued)

(58) Field of Classification Search
CPC .... F25D 21/002; F25D 21/006; F25D 21/008; F25D 21/02; F25D 11/003;
(Continued)

(56) References Cited

U.S. PATENT DOCUMENTS 3,465,534 A    9/1969  Sutton, Jr. et al.
4,646,529 A *  3/1987  Hanson ................. F25D 21/008
                                                          62/126
(Continued)

FOREIGN PATENT DOCUMENTS

DK   WO 2016000750 A1 *  1/2016  ........... F25D 21/006
JP   S49-103043             9/1974
(Continued)

*Primary Examiner* — Marc Norman
(74) *Attorney, Agent, or Firm* — Snyder, Clark, Lesch & Chung, LLP

(57) ABSTRACT

The present invention relates to a method, device and computer program for terminating a defrosting cycle within a refrigerated transport container. The container may include: a transport volume, a cooling unit comprising an evaporator arranged in a cooling space, a return air grid arranged to separate said cooling space from said transport volume, means for sensing temperature indicative of the return air temperature of air returning to said cooling space from said transport volume or the temperature of the return air grid, means for actively heating said evaporator during defrosting cycles, and a processor configured for controlling the duration of said defrosting cycles. The method includes: establishing an indicator(s) indicative of frost and/or ice build-up on said return air grid, and terminating a defrosting cycle when an indicator(s) of frost and/or ice build-up on said return air grid indicates that said return air grid is free of frost and/or ice.

20 Claims, 4 Drawing Sheets

(51) Int. Cl.
*F25D 21/02* (2006.01)
*B60H 1/32* (2006.01)

(52) U.S. Cl.
CPC ........... *F25D 21/006* (2013.01); *F25D 21/02* (2013.01); *F25D 2700/10* (2013.01); *F25D 2700/12* (2013.01)

(58) Field of Classification Search
CPC ............ F25D 2700/10; F25D 2700/12; F25B 2347/02; F25B 2700/11; F25B 2700/2104
USPC .................................................. 62/151, 155
See application file for complete search history.

(56) References Cited

U.S. PATENT DOCUMENTS

| | | |
|---|---|---|
| 6,205,800 B1 | 3/2001 | Topper et al. |
| 6,609,388 B1 * | 8/2003 | Hanson ................. B60H 1/321 62/151 |
| 6,672,086 B2 | 1/2004 | Zangari et al. |
| 9,322,585 B2 * | 4/2016 | Ikemiya ................ F25B 49/005 |
| 9,528,745 B2 * | 12/2016 | Lukasse ................... F25D 21/04 |
| 2003/0202557 A1 | 10/2003 | Hanson et al. |
| 2006/0248904 A1 | 11/2006 | Ludwig |
| 2012/0266621 A1 | 10/2012 | Yokohara et al. |
| 2013/0014521 A1 | 1/2013 | Lukasse |

FOREIGN PATENT DOCUMENTS

| | | |
|---|---|---|
| JP | S51-112268 | 9/1976 |
| JP | S53-036745 | 3/1978 |
| JP | S63-183335 | 7/1988 |
| JP | H7-28548 | 6/1995 |
| JP | H09 287867 A | 11/1997 |
| JP | 2002-107048 | 4/2002 |
| JP | 2003-329338 | 11/2003 |
| JP | 2011-252702 | 12/2011 |
| JP | 2012-112620 | 6/2012 |
| JP | 2013-57489 | 3/2013 |
| WO | 2014147076 A1 | 9/2014 |

* cited by examiner

METHOD OF DECIDING WHEN TO TERMINATE A DEFROSTING CYCLE WITHIN A REFRIGERATED CONTAINER

RELATED APPLICATION

This application claims priority under 35 U.S.C. § 119 based on Danish Patent Application No. DK PA 201570889, filed Dec. 29, 2015, the disclosure of which is hereby incorporated by reference herein.

TECHNICAL FIELD

According to a first aspect, the present invention relates to a method of deciding when to terminate a defrosting cycle within a refrigerated transport container.

The refrigerated transport container includes:
a transport volume (45),
a cooling unit comprising at least an evaporator arranged in a cooling space (41),
a return air grid (42) arranged to separate said cooling space from said transport volume (45),
means for sensing temperature indicative of the return air temperature of air returning to said cooling space (41) from said transport volume or the temperature of the return air grid (42),
means for actively heating said evaporator (16) during defrosting cycles, and
a processor configured for controlling at least the duration of said defrosting cycles.

According to a second aspect of the present invention, a device or a system or a controller configured for deciding when to terminate a defrosting cycle within a refrigerated transport container is provided.

According to a third aspect of the present invention, a computer readable medium including software configured for deciding when to terminate a defrosting cycle within a refrigerated transport container is provided. The software may constitute a software/firmware for a refrigerated transport container.

The refrigerated transport container may constitute an intermodal shipping container.

Throughout this disclosure, the word "ice" denotes frozen water, a brittle transparent crystalline solid. By the word "frost" is meant small white or bright crystals formed when water vapour deposits from water-saturated air. Frost is formed when solid surfaces are cooled to below the so-called dew point of the adjacent air as well as below the freezing point of water. A flow of warm air melts ice much slower than frost due to the much smaller surface to volume ratio of ice.

BACKGROUND ART

A refrigerated transport container, or a so-called reefer container, is a shipping container used for freight transport. The container is cooled or refrigerated for the transportation of temperature-sensitive cargo. A typical reefer container consists of a refrigerated transport volume in connection with an active cooling unit that typically relies on external electric power supply.

The impact on society of refrigerated transport containers is vast, allowing consumers all over the world to enjoy fresh products at any time of the year and experience previously unavailable fresh products from different parts of the world.

Most consumers take for granted that fresh products of all kinds are available and reasonably priced in every grocery shop all year round.

Providing consumers according to their expectations requires technologically advanced reefer containers with reliable, automated climate control systems and sophisticated logistics solutions.

The evaporator is the part of the refrigeration system in which the refrigerant absorbs heat from the transport volume and thereby cools air forced over or through the evaporator or evaporator coils by means of one or more evaporator fans. In this process, moist and water carried by the air passing over or through the evaporator may settle on the cold surfaces of the evaporator thereby initiating frost and/or ice build-up on the surface(s) of the evaporator. The frost and/or ice build-up accumulates over time to a level capable of hindering proper operation of the cooling unit if not countered by proper defrosting measures.

A defrost controller, or a defrost functionality incorporated to a processor controlling the operation of the cooling unit, therefore typically is provided.

In the following, for the sake of simplicity, the denomination "defrost controller" is referring to a defrost controller as such and/or the said defrost functionality incorporated to a processor controlling the operation of the cooling unit.

For a regular so-called defrosting cycle, or defrosting period, the defrost controller normally has two decision moments:
a) the first decision moment is when to initiate the defrosting cycle, and
b) the second decision moment is when to terminate the defrosting cycle.

The second decision moment may be set during a current defrosting cycle or prior to the first decision moment.

The first and the second decision moments may, according to prior art, be triggered e.g. by certain parameters reaching a predetermined threshold and/or the lapse of a given timeframe.

Frozen mode operation of a reefer container is operation at a temperature set point below, or well below, 0° C. or −5° C.

Three situations, which may occur during frozen mode operation, or in modes of operation wherein the return air temperature is about 0° C. and below, are:
i. the formation and build-up of frost and/or ice on the surfaces of the evaporator, and/or,
ii. the formation and build-up frost of and/or ice on components in the cooling space above or upstream the evaporator, and/or
iii. the formation and build-up of ice on one or more faces of the floor underneath the evaporator, i.e. in the supply air ducts.

The first situation (i.) is considered a common situation. Prior art methods and systems for defrosting are configured for addressing this situation and the first and the second decision moments a) and b) as per above therefore are set or controlled to counter this situation.

The components housed or accommodated in the space above or upstream the evaporator and furthest away from the evaporator, as per situation (ii.) above, is the return air grid, which is arranged to separate the cooling space from the cargo space or transport volume without substantially hindering through flow of air. On some occasions, also the return air grid may be susceptible to formation and build-up of frost and/or ice, which in turn gives rise to air flow wise problems that, ultimately, need to be addressed in order to secure proper operation of the refrigerated container.

In case the return air grid blocks completely, air circulation in the container may be irreversibly blocked which in turn may necessitate repacking of cargo to another refrigerated container.

Formation of ice on components in the cooling space arranged above or upstream the evaporator, especially on the return air grid, usually occurs when the climate conditions in the refrigerated transport container include presence of super-cooled fog and/or ice crystals present in the return air flow.

Formation and build-up of frost and/or ice on or in the floor underneath the evaporator, as per situation (iii.) above, i.e. in the supply air duct, may also potentially irreversibly block air circulation in the container and necessitate repacking of cargo to another refrigerated container.

Repacking of temperature sensitive cargo is associated with temperature abuse, loss of time and the cause of substantial additional expenses to the shipping company.

Irreversible blocking of the air circulation can usually be avoided in frozen mode shipments, but incidentally does occur. In particular, irreversible blocking occurs in shipments with a very moist load, which load still needs to be cooled down after loading it into the container.

A conceivable solution to the problem of accumulating ice in the air ducts or elsewhere would be to simply supply heat to locations where ice may accumulate. Ice primarily tends to accumulate on the floor of the refrigerated transport container and on melt water collection guides provided on the inner walls of the cooling space. A solution to the problem of accumulating ice could be to avoid ice formation by supplying sufficient amounts of heat to the mentioned locations during defrost cycles. However, supply of heat to the mentioned locations would then require installation of heating elements such as trace heating elements in the location where ice is observed to accumulate to a problematic level, i.e. primarily in or close to the supply air duct region.

Since refrigerated transport containers need to be highly standardized due to requirements of the shipping industry in which they are used, it is unlikely that some containers could be specifically adapted for carrying very moist loads. Especially certain de facto shipping industry requirements, such as economy of scale, global utilisation and unlimited versatility of the container fleet, work against such adaptation of a minor portion of the reefer containers.

WO 2014/147076 A1 discloses a reefer container for shipping palletized cargo. The container includes a reefer machine where air circulating or passing through the reefer machine is divided into ducts at both sides of the container. The invention further relates to a method of loading a reefer container with pallets.

U.S. Pat. No. 3,465,534 A discloses an apparatus for defrosting the evaporator of a refrigerator when the flow of air through the evaporator becomes relatively obstructed by frost. The flow of air through the evaporator is measured with respect to the air flow in a reference path which bypasses the evaporator. The flow rates are sensed by a pair of self-heating thermistors, one thermistor being located in each of the paths. The thermistors are constructed of a semiconductor material having a transition temperature above which the resistance of the material rises abruptly. Thus, when current is applied to the thermistors to cause them to self-heat, the abruptly rising resistance characteristic causes the thermistors to be self-regulating at the transition temperature.

US 2003/202557 A discloses a transport temperature control unit and methods of defrosting an evaporator coil of a transport temperature control unit. The transport temperature control unit includes an evaporator coil, an ambient air temperature sensor for sensing an ambient air temperature, a return air temperature sensor for sensing a return air temperature, a discharge air temperature sensor for sensing a discharge air temperature, an evaporator coil temperature sensor for sensing an evaporator coil temperature, and a controller. The controller initiates a defrost cycle when a large temperature differential occurs over the evaporator.

US 2006/248904 A discloses a method of conditioning air in a vehicle load space. The method includes providing a refrigeration circuit including an evaporator, directing refrigerant through the refrigeration circuit, directing load space air across the evaporator, sensing a first condition based on one of a temperature and a pressure of the refrigerant in the refrigeration circuit upstream from the evaporator, determining a second condition based on one of a temperature and a pressure of the refrigerant in the evaporator, determining a difference between the first condition and the second condition, and initiating a defrost process of the evaporator when the difference is greater than a threshold.

U.S. Pat. No. 6,672,086 BB discloses a frosting cooler that on purpose supplies fog to the cooler. This is done with the object to create and maintain frost on cold products, such as bottles of a beverage stored in the cooler. By this is provided a visual manifestation of the cold condition of the beverage, which is meant to be highly attractive for thirsty consumers. The cooler has the ability to deliver moisture to the products within the cooler so that frosting may be produced in environments where there is low humidity in the ambient air without freezing the liquid contained by the bottle. The cooler is operated to control and to protect the frost on the products, once formed. In addition, the document discloses a design which prevents frost formation on objects in the air flow pathway between the product volume and the evaporator by just omitting or repositioning those components. Consequentially the mentioned specification does not describe a return air grid. Secondly it places the one or more evaporator fans such that air first hits the evaporator coil and then the fan, which is an effective way to avoid frost formation on the fan, though it leads to reduced refrigeration capacity and increased energy consumption.

Even if the frosting cooler described in the abovementioned U.S. Pat. No. 6,672,086 BB is designed and controlled to prevent frost build up on an evaporator and fan in an insulated cabinet in which products are to be stored, the environment is different as compared to a multi-purpose refrigerated transport container. As mentioned, a refrigerated container is a type of equipment that must be suited to carry any type of temperature-controlled cargo. The described frosting cooler also lacks a return air grid, which is an indispensable piece of equipment in a refrigerated transport container, through which return air passes on its way towards the fans and only then the evaporator coil.

In addition to the commercially motivated desire of utilising multi-purpose refrigerated transport containers without modifications, extra hardware comes with a purchase cost, requires installation, maintenance and occupies physical space needed for air flow etc.

Moreover, to position one or more evaporator fans such that air first passes the evaporator and then the evaporator fans, i.e. below the evaporator and as proposed by U.S. Pat. No. 6,672,086 BB, would supress the refrigeration unit's cooling capacity and energy efficiency. It would mean an energetic disadvantage in any shipment, to solve the problem of frost formation on evaporator fans in the rare scenarios where frost accumulates on the evaporator fans in the current design. As long as the evaporator fan position does not change, the return air grid needs to stay in place to avoid that objects, e.g. loose packaging materials or human fingers, hit the rotating evaporator fans.

In conclusion, there is a need for an efficient solution to above described problems, especially in frozen mode operation, or in modes of operation wherein the return air temperature is about 0° C. and below. The problems are pronounced also in situations where the temperature of moist loads is to be pulled down to a transport temperature below 0° C.

The primary problem to be solved by the present invention is to prevent formation and/or build-up of frost and/or ice on components in the cooling space above or upstream the evaporator, and in particular on the return air grid.

The secondary problem to be solved by the present invention is to prevent and/or counter the formation and/or build-up of ice underneath the evaporator, i.e. in the supply air duct(s) or in the entries of the T-bar flooring/grating on which the cargo rests.

Experience shows that the secondary problem is the consequence of not properly addressing the primary problem, i.e. as long as the return air grid is kept free of ice and/or frost, the abovementioned remaining parts of the refrigerated transport container will remain essentially free of ice and/or frost.

SUMMARY OF THE INVENTION

Embodiments of the present invention address the problems of ice and/or frost formation and build-up as mentioned above by providing a method of deciding when to terminate a defrosting cycle within a refrigerated transport container 1 according to the introductory part of this specification wherein the method includes the steps of:
  establishing one or more indicators indicative of frost and/or ice build-up on said return air grid 42,
  deciding to terminate a defrosting cycle only when said one or more indicators indicative of frost and/or ice build-up on said return air grid 42 indicate that said return air grid is free of frost and/or ice.

By this, a method of defrosting not only the evaporator as per the prior art proposals, but also additional components known to accumulate frost and/or ice under certain conditions is set forth.

The decision to terminate a defrosting cycle may constitute a decision to prolong or extend a defrosting cycle such as an evaporator defrosting cycle.

The indicators indicative of frost and/or ice build-up on said return air grid 42 may be configured or chosen to indicate whether or not the air grid is blocked or partially blocked by frost and/or ice.

The aforementioned primary problem ii. and hence implicitly also secondary problem iii. is therefore solved by prolonging evaporator defrost cycles to allow heat applied to the evaporator to propagate, possibly by natural convection, to components above the evaporator, such as the return air grid 42, and melt off any accumulated frost and/or ice from the said components.

Upon the indicators indicative of frost and/or ice build-up on the return air grid meeting predefined conditions, the defrosting cycle is terminated by switching off defrosting heat and resuming a non-defrosting mode of operation of the cooling unit.

Termination of the prolonged or extended defrosting cycles therefore may take place when one or more of the predefined indicators meet the predetermined conditions.

In some embodiments of the present invention, the indicators indicative of frost and/or ice build-up may constitute indicators representative of frost and/or ice build-up in the air duct(s) below the cooling unit and/or below the cargo space as well as in the lower part of the cooling unit.

By means of the present invention, it is achieved that ideally the entire cooling space 41 stays free of frost and/or ice. During an extended defrosting cycle, all frost and/or ice melts off the evaporator 16, the return air grid 42 and all components in between, and all melt water is expelled to outside the container through one or more water collection guides 21. The defrosting and de-icing processes are described in greater detail in the following detailed description.

Due to the present invention, a multi-purpose refrigerated transport container that is suited to carry temperature-sensitive cargo may also be used for the transportation of a very moist load in frozen mode during temperature pulldown—without risk of damaging the cargo due to interruptions in the cooling process; this without requiring any hardware modifications.

As the mode of operation of already available modern reefer containers typically may be reconfigured by means of a software update wherein the method according to the present invention is incorporated, no extra costs typically to the purchase of hardware are incurred, and no need for installation or maintenance and physical space needed for cargo or air flow is occupied by the extra hardware.

The return air grid 42 as well as the supply air duct 46 in a standard refrigerated container is not visible and not easily accessible once the container is filled with cargo; especially when the container is stowed within cell guides in a container hold of a container vessel. Consequently, the formation of frost and/or ice in those locations can neither easily be seen nor mechanically removed.

The supply air duct underneath the evaporator is only accessible through the transport volume. Therefore, the procedure to salvage what is left of the cargo in the kind of situations which are addressed by the present invention, if the situation is noticed at all and if the container generally is accessible, is to first break the customs seal at the door locks, open the doors and then repack the cargo into another refrigerated container, and sort out the customs-related paper work due to change of refrigerated container identification number and new customs seal.

By means of the present invention, the above mentioned highly undesirable procedure can be avoided. The avoidance of this procedure is highly desirable to all stakeholders involved in the shipment of frozen or chilled cargo in a refrigerated transport container.

As an alternative for the complete repacking procedure, it is sometimes attempted to unload at least part of the cargo and then try to remove the accumulated ice and frost mechanically. Obviously it is impossible to do when the container is stowed in a cargo hold, typically in-between cell guides, on board a container vessel.

In accordance with various alternative embodiments of the present invention, the method may include application of indicators representing predetermined conditions that, empirically or not, may represent conditions in which substantially all frost and/or ice has melted also from the at least one evaporator fan 10 and/or from the evaporator 16 and/or from all other components above or upstream the evaporator 16 and/or from anyone of a return air temperature sensor 5 and a defrost temperature sensor 17 arranged inside the cooling space 41. By this is achieved that the method according to the present invention can be adapted to different circumstances affecting the conditions in which frost and/or ice may accumulate on components other than the evaporator as per prior art proposals.

In accordance with an alternative embodiment of the present invention, the method may include determining one or more of the predefined indicators, which may be temperature, by a temperature sensor preferably arranged at the height of the at least one evaporator fan or above or, alternatively or not, by a temperature sensor positioned in the cooling space optionally at a position higher than the highest point of the evaporator or, as a further alternative, by at least one temperature sensor arranged on or on either side of the return air grid 42. By this is achieved that the method can be adapted to different circumstances that affect predetermined or representative conditions for measuring and or establishing indicators indicative of frost and/or ice build-up of the return air grid 42, or the lower part of the cooling space 41, 46 or in the air duct(s) below the cargo.

In accordance with yet another alternative embodiment of the present invention, a protective recess may be provided in the inner wall or ceiling of the refrigerated transport container so as to house a temperature sensor when positioned on the transport volume side of the return air grid. This recess offers protection to the temperature sensor, so as to facilitate simplified and efficient loading or related management of the refrigerated transport container without running the risk of damaging or even destroying sensitive measurement equipment. In particular, this is of value when one or more temperature sensors are housed on the transport volume side of the return air grid 42. The protective function of the recess can be utilised on either sides of the return air grid 42 or anywhere in the refrigerated transport container where measurement equipment is to be installed.

In accordance with yet another alternative embodiment of the present invention, the method may utilise that one of the predefined indicators may be time elapsed since start of the defrosting cycle. This indicator has the benefit of providing a further option of terminating a defrosting cycle and/or controlling the effects that a defrosting cycle has on frost and/or ice melting from essential components in a refrigerated transport container. Moreover, further advantages of this indicator are related to the option of measuring temperature as a function of elapsed time according to the below.

In accordance with yet another alternative embodiment of the present invention, the method for defrost termination control may include that one of the predefined indicators may be a function of temperatures logged since defrost initiation. This has the benefit of providing a further option of terminating a defrosting cycle after an indication can be determined that represent conditions in which substantially all frost and/or ice has melted from other components than only the evaporator.

In yet another embodiment of the present invention, the method may include the step of automatically deciding and ultimately controlling when to terminate a defrosting cycle, or an extended or prolonged defrosting cycle, following an indication that substantially all frost and/or ice has melted from the return air grid 42 positioned in the return air flow in between the transport volume 45 and the cooling space 41. This has the advantage of avoiding unnecessarily long defrost periods, while reducing or even eliminating the need for manual input and assistance, and thus the need for operator input.

According to one embodiment, a container such as an intermodal shipping container, provided with means configured for defrosting according to the present application is provided.

Generally, the present invention provides a method and various interrelated means for addressing the root cause of the problem of ice formation in supply air duct 46 instead of just attempting to counter the effects of that ice formation.

Alleviating the root cause of the problem of ice formation in supply air duct 46 requires complete understanding of a chain of events that leads to that formation of ice.

The sequence of steps leading to ice formation in the supply air duct 46 is as follows: in a fourth step, the supply air duct 46 ices up, after in a third step the one or more melt water collection guides 21 ice up, after frost and/or ice is still melting when defrost cycles terminate in a second step, after this frost and/or ice first accumulated in locations, such as on the return air grid 42, above the evaporator 16 in a first step. Consequently, the root cause ice build-up in supply air duct 46 and ultimately blockage may be frost and/or ice build-up on the return air grid 42.

The previously mentioned chain of events may occur, as mentioned, in shipments with a very moist load, such as brine frozen fish, in particular brine frozen tuna, which still needs to be cooled down after loading, so as not to deteriorate during transportation.

The here proposed solution calls upon prolonged or extended defrost cycles while relying on natural convection, i.e. the fact that hot air rises, to transport heat applied to the evaporator further up into the unit or cooling space 41, and only terminate the defrosting cycle when substantially all frost and/or ice accumulated in locations above the evaporator 16, including the return air grid 42, has melted. This explains the targeting especially to the second step in the chain of events mentioned above.

The method according to the present invention enables a selection of cases where it is necessary to call upon prolonged or extended defrosting cycles as follows: either an operator sets an input to the controller at the start of a shipment with very moist load which still needs to be cooled down after loading cargo into the container or an automated algorithm detects the need for a prolonged defrost cycle. This automated detection could be based on observed abnormal behaviour of the refrigeration unit, one of these abnormal behaviours being the detection of remarkably rapid frost formation on the evaporator, resulting in a need for unusually frequent defrosting. Such remarkably rapid frost formation leaves behind particular patterns that can be detected by various detection techniques, including measurement of return air temperature and/or return air temperature trajectories and/or elapsed time required for completion of the defrosting cycle.

DETAILED DESCRIPTION WITH REFERENCE TO THE DRAWINGS

The present disclosure is generally referring to a standard refrigerated transport container, and the mentioned features are normally present in standardised refrigerated transport containers irrespective of type. However, the construction of other typical cooling units or refrigeration units used in connection with refrigerated transport containers may differ in some respects without departing from the scope of the claims related to this invention.

Figures 1, 2:
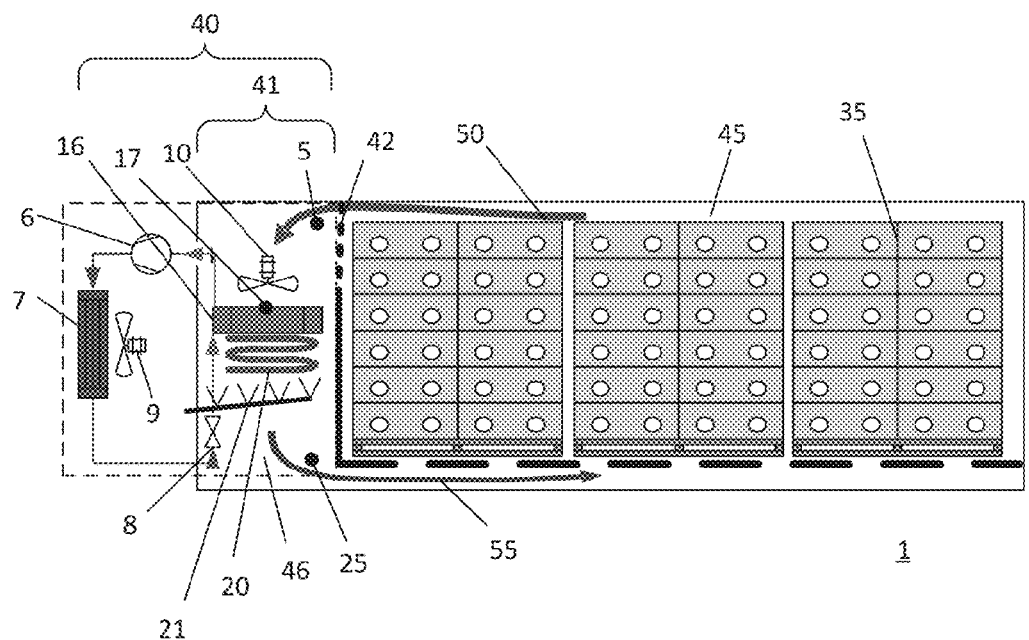
FIG. 1 schematically illustrates a simplified longitudinal sectional view of a refrigerated transport container in accordance with an aspect of the present disclosure.
FIG. 2 illustrates a return air temperature trajectory of a defrosting cycle where the return air grid is frosted, or at least partially blocked, at the start of the defrosting cycle.

FIG. 1 illustrates an example of a refrigerated transport container 1 comprising a front section having a cooling or refrigeration unit or system 40 and a load/cargo section or transport volume 45.

The transport volume 45 of the refrigerated transport container 1 comprises a commodity or cargo load e.g. comprising a plurality of stackable transport cartons or crates 35 arranged within the transport volume 45 such as to leave appropriate or sufficient clearance between the ceiling and the load in order to secure sufficient return air flow passage above the load.

The cooling unit 40 in this example comprises a so-called vapour compression refrigeration circuit and a cooling space 41. The refrigeration circuit comprises at least a compressor 6, a condenser 7 with one or more condenser fans 9, an expansion device or throttle valve 8, an evaporator 16 with one or more evaporator fans 10 arranged upstream the evaporator 16.

The compressor 6 and the condenser 7 with the one or more condenser fans 9 are typically situated outside the insulated enclosure of the transport container 1.

The evaporator 16 may also include or accommodate a so-called defrost temperature sensor 17 measuring the temperature of the external surface of the evaporator 16. The defrost temperature sensor 17 measures the air-side surface temperature of the evaporator or a representative thereof.

The cooling space 41 is situated inside the insulated enclosure of the refrigerated transport container 1.

The cooling space 41 is normally separated from the transport volume 45 by a panel or bulkhead. The upper part of the panel includes a so-called return air grid 42, which is perforated or otherwise open to passage of air. When the evaporator fans 10 rotate they draw a return air flow 50 from the transport volume 45 through this return air grid 42 into the cooling space 41. Simultaneously a supply air flow 55 is expelled into the transport volume 45 through the supply air duct 46, situated in the lower end of the cooling space 41. The air flow through the cooling space as well as through the transport volume 45 is maintained by one or more evaporator fans 10.

The return air grid 42 marks the entrance for air from the transport volume 45 into the cooling space 41. On its way through the cooling space 41 air successively passes a return air temperature sensor 5, the air flow-maintaining one or more evaporator fans 10, the evaporator coil 16 with in or right on top of it the defrost temperature sensor 17, possibly one or more electric heater elements 20, the defrost melt water collection guides 21, and supply air temperature sensor(s) 25 situated in the supply air duct, after which air is supplied to the T-bar floor of the refrigerated transport volume 45.

The space from the lower end of evaporator 16 till the T-bar floor entry is denoted supply air duct 46.

The return air grid 42 has a precautionary function to avoid that objects, e.g. loose packaging materials or human fingers, hit the rotating evaporator fan 10 during operation.

The one or more defrost melt water collection guides 21 are situated underneath the evaporator 16 and the possible heating unit 20. The defrost melt water collection guide 21 comprises a sequence of drain gutters or drip trays, collecting defrost melt water dripping off the evaporator or parts in the cooling space 45 above the evaporator 16 and guides the water to a so-called drain pan, which at the lower-end has an opening connected to the drain line, through which melt water is then expelled to the outside of the container.

A control system comprises a programmed microprocessor or equivalent, which controls amongst others the compressor 6 and the heating unit 20 in accordance with a control algorithm defined by a set of microprocessor program instructions. The control system may additionally comprise a user interface, for example an LCD display and a keypad, where an operator or ship technician can enter or modify certain parameter values of the control algorithm such as a set point temperature of the refrigerated transport container 1, to mention only one parameter among a plurality of variable parameters.

It is normal that during operation some frost accumulates on the evaporator 16. Therefore, to counter this formation of frost, a defrost controller periodically interrupts cooling operation with a defrosting cycle to defrost the evaporator 16.

For one defrosting cycle a defrost controller has, as mentioned above, two decision moments: when to initiate a defrosting cycle and when to terminate a period of defrosting operation. Ideally, during a normal defrost cycle all frost melts off the evaporator 16, all melt water is expelled to the outside of the container through the at least one defrost melt water collection guide 21, and the time period between defrost start and defrost termination is adapted to be no longer than strictly necessary.

Unnecessarily long defrost cycles may lead to waste of energy and may also increase the risk of temperature abuse to cargo situated in the transport volume 45, in particular to sensitive cargo that is situated close to the return air grid 42.

When the control system indicates or finds a need to start a defrost cycle, the system stops the evaporator fan or fans 10. It also stops the supply of liquid refrigerant to the evaporator 16 through the expansion device 8. Moreover, it starts the supply of heat to the evaporator 16 through either the possibly present heating unit 20 and/or by changing the refrigerant flow path in such a way that hot refrigerant gas leaving the compressor 6 is lead to flow into the refrigerant side of evaporator 16.

Common defrost termination logics aim to terminate a period of defrosting operation right after all frost has melted off the evaporator ('evaporator defrost'). Typically this is achieved by applying two termination criteria and terminating a defrosting cycle when at least one of them is met.

The two usual termination criteria are:
when a set maximum defrost duration lapses, or
when the defrost temperature sensor 17 reaches a predetermined defrost termination temperature set point with a value well above 0° C., for example +18° C.

To terminate a period of defrosting operation right after all frost has melted off the evaporator the time-criterion is to be tuned in such a way that the defrost temperature sensor criteria is decisive. The defrost temperature sensor 17 is to be positioned in or on the part of the evaporator 16 where frost usually melts last. In refrigerated transport containers that is preferably somewhere at the top side or just above the evaporator 16.

In some shipments with return air temperature below 0° C., frost forms on locations in the cooling space 41 above or upstream the evaporator 16. This especially happens in shipments of very moist cargo which still needs to be cooled down after loading into the container. In extreme cases the return air grid 42 frosts up heavily, thus impairing air circulation through the transport volume 45 and starting a not-so-obvious chain of events causing ice accumulation in the supply air duct etc. It is believed that frost formation on the return air grid 42 only occurs when there exists supercooled fog and/or ice crystals present in the return air flow, which might happen in very moist cargo, which cargo still needs to be cooled down after having been loaded into the container.

When frost has formed in locations above or upstream the evaporator 16 the usual "evaporator defrost" termination procedure terminates a defrost cycle prematurely. By that is meant that the defrosting cycle then terminates too early for the removal, i.e. thawing up, of frost accumulated above the evaporator 16, with the return air grid 42 being the highest location where frost or ice may accumulate. If some frost has accumulated above the evaporator coil then some of it will still be melting while the "evaporator defrost" procedure terminates the defrosting cycle.

When a defrosting cycle terminates prematurely, i.e. while there is still melt water flowing through and towards the melt water collection guide(s), this carries the risk of ice build-up in those guide(s) because freezing conditions return while there is still liquid water present. In the next defrost cycle this ice is much harder to melt than frost because of its more compact nature. Moreover it is hard to direct defrost heat to the collection guide(s) 21 because they are typically located underneath the heat source, i.e. the possible heating unit or the evaporator tubes filled with hot gas.

Over a series of one or more prematurely terminated defrosting cycles, ice in some parts of the collection guide(s) 21 may accumulate to such a level that it totally clogs the guides 21. From that moment on all melt water spills to the floor in the supply air duct 46, where it freezes. In extreme scenarios this floor ice then accumulates to a level where it completely blocks the air circulation through the cooling space 41, the cargo in the transport volume 45 no longer receives cooling and its temperature starts to rise.

The control system or unit according to the present invention decides whether to apply "return air grid defrosts", i.e. prolonged or extended defrosting cycles by postponing the defrost termination until substantially all frost and ice has melted from the evaporator 16 and components higher up in the cooling space 41, including the return air grid 42.

One aspect of the invention constitutes a method of prolonging and/or extending and/or maintaining a defrosting cycle by deciding when to terminate the defrosting cycles at a duration wise later stage than the termination stage of an evaporator defrosting cycle.

Another related aspect of the invention is the decisions whether it is necessary to apply a prolonged defrosting cycle. As previously mentioned, by means of the present invention, it is achieved that ideally the entire cooling space 41 stays free of ice.

FIG. 2 illustrates a return air temperature trajectory typically of a defrosting cycle where the return air grid 42 is frosted or at least partially blocked at the start of the defrosting cycle. The curve has been recorded by a return air temperature sensor 5, but any other temperature sensor positioned in the cooling space at a position higher than the highest point of the evaporator would record a comparable temperature trajectory.

The defrosting cycle starts at time 0. In FIG. 2 phase A is the period where return air temperature hardly rises, despite supplying heat to the evaporator. In phase A return air temperature rises only slowly because most sensible heat supplied to the evaporator 16 is converted to latent heat by the frost or ice melting off the evaporator 16. Once the evaporator 16 is free of frost or ice, more sensible heat starts to flow into the upper parts of the cooling space 41, such driven by natural convection, resulting in an increased slope of the return air temperature curve, see phase B. When the return air temperature reaches 0° C. frost in the direct vicinity of the return air temperature sensor 5 starts to melt, and most sensible heat reaching the return air temperature sensor 5 is converted into latent heat, resulting in a reduction of the slope of the return air temperature curve to approximately 0° C./min in phase C. As soon as the return air temperature sensor 5 is frost free the slope of the return air temperature curve increases again, see phase D. Because the return air grid 42 is blocked with frost or ice the heat stays locked up in the cooling space 41. When melting progresses at the return grid 42, the return air grid 42 opens up and thereby allows for air flow, warm air starts to escape from the cooling space to the transport volume, which may then lead up to a temporary negative slope of the return air temperature curve, see phase E. After all frost has melted, the air flow resistance stays constant, and natural convection causes a bottom-up air flow through the cooling space.

Meanwhile return air temperature gradually rises at a relatively slow pace, because the warm air easily escapes to the transport volume 45, see phase F.

Would there be no frost accumulation on components other than the evaporator 16, then the temperature curve in FIG. 2 would transition smoothly from phase A to phase F.

An "evaporator defrost" typically terminates at the end of phase A or in the beginning of phase B, i.e. when substantially all frost has melted from the evaporator 16.

Using measured return air temperature as a predefined indicator, and comparing it to predetermined conditions, one could terminate a defrosting cycle after there is indication that substantially all frost and/or ice has melted from other components than from only the evaporator 16. Some examples with reference to FIG. 2:

A condition in which substantially all frost or ice has melted from the at least one evaporator fan 10 is when return air temperature exceeds a value well above 0° C., for example 2° C., which is well beyond phase C in FIG. 2.

A condition when substantially all frost or ice has melted from a return air grid 42 and all other components above the evaporator 16 inside the cooling space 41 is when return air temperature during the last e.g. 5 minutes has been larger than e.g. 1° C. and during that period the slope of the return air temperature curve has always been positive but not steep, e.g. averaged over the e.g. 5 minutes between 0 and e.g. 1° C./min, a slope typical of phase F in FIG. 2.

Apart from a measured temperature one could use the time elapsed since start of defrost as a predefined indicator, and compare it to a pre-set maximum defrost duration as predetermined condition. One would then typically use prior experiences to tune the pre-set maximum defrost duration to the worst case frost formation. For the case of FIG. 2 a pre-set maximum defrost duration of 34 minutes would be an effective predetermined condition.

Figure 3:
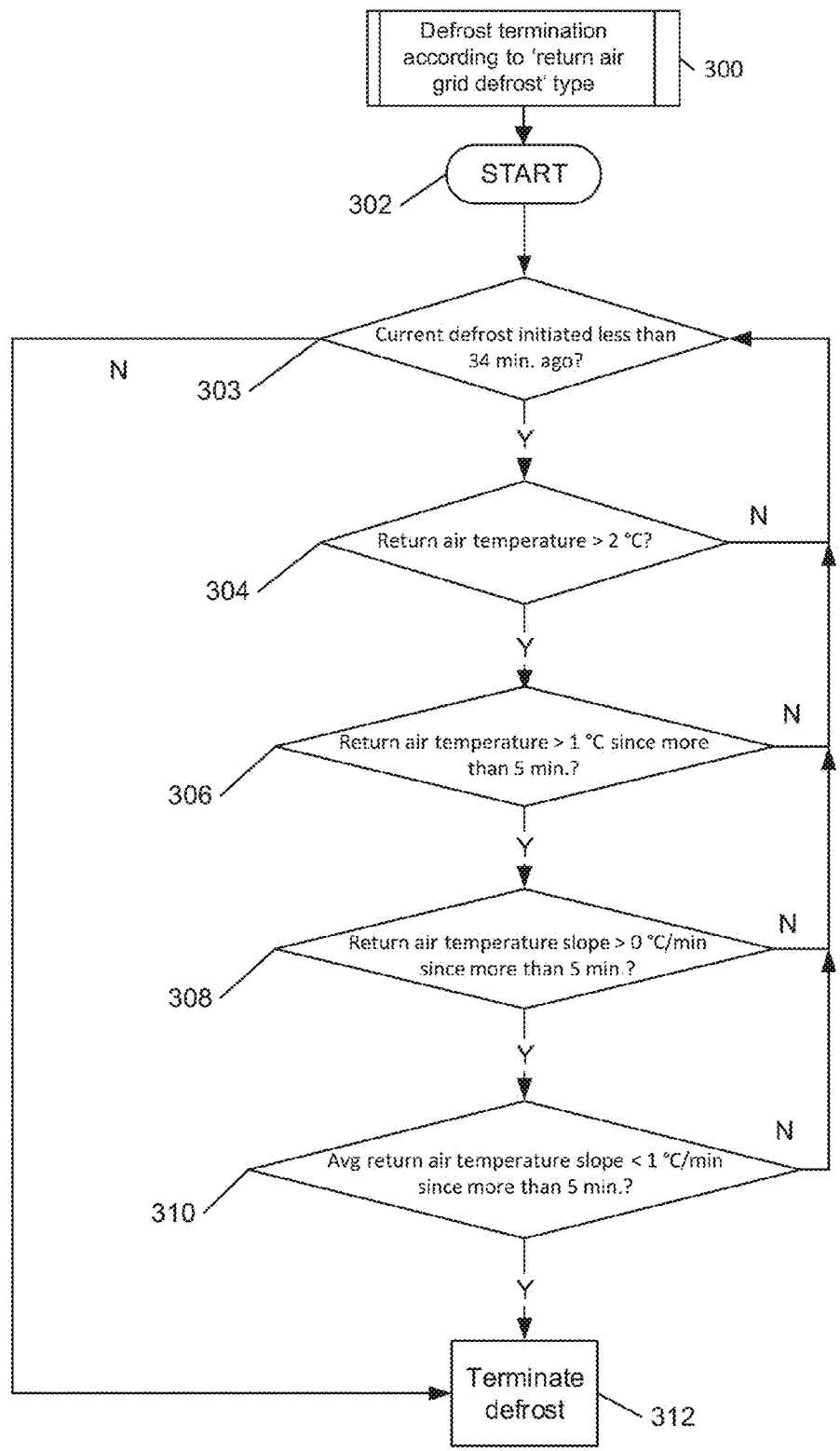
FIG. 3 illustrates a flow chart of the method according to the present invention for reducing and/or avoiding formation of frost and/or ice.

FIG. 3 is a flow chart illustrating exemplified steps executed by a microprocessor-implemented defrosts termination control method or algorithm or program of a control system of a refrigerated transport container. The procedure in FIG. 3 is to be called on a frequent basis during a "return air grid defrost" cycle, e.g. not less than once per 5 minutes but preferably not less than once per 5 seconds.

The flow chart shown in FIG. 3 provides one example of the operation of a defrost termination procedure according to a "return air grid defrost" type 300. According to this example of operation, the name "return air grid defrost" type refers to a method for comparing predefined indicators to predetermined conditions related to temperature and/or time, where the predetermined conditions represent conditions in which substantially all frost and/or ice has melted from a return air grid 42 positioned in the return air flow in between the transport volume and a cooling space 41, and terminating the defrosting cycle by switching off the heat supply when one or more of the predefined indicators meet the predetermined conditions.

The algorithm starts in step 302 and proceeds to step 303 where it is determined whether the current defrost was initiated less than e.g. 34 minutes ago. If the test in step 303 is no (N) the method applies a timer-based defrost termination by proceeding to step 312.

In step 312 the method terminates the current defrost cycle by switching off the heat supply to the evaporator, and the cooling system reverts to freezing operation. If the test in step 303 is yes (Y) the method proceeds to step 304.

In step 304 the method checks if the return air temperature has risen till above e.g. 2° C. If the test in step 304 is no (N) the return air grid may still be frosted and the method reverts to step 303.

If the test in step 304 is yes (Y) the return air temperature sensor is free of frost and the method proceeds to step 306. In step 306 the method checks if the return air temperature has been above e.g. 1° C. for more than e.g. 5 minutes.

If the test in step 306 is no (N) it is too early to test if the return air temperature curve has entered phase F (see FIG. 2) and the method reverts to step 303.

If the test in step 306 is yes (Y) the method proceeds to step 308. In step 308 the method checks if the slope of the return air temperature trajectory has always been positive during the last e.g. 5 minutes.

If the test in step 308 is no (N) phase E (see FIG. 2) is part of the last 5 minutes and it is still too early to decide if the return air grid is completely free of frost, hence the method reverts to step 303. The test in step 308 can only be yes (Y) if the return air temperature resided in phase D or F (see FIG. 2) during the last 5 minutes, not if phase E has been part of the last 5 minutes.

If the test in step 308 is yes (Y) the method proceeds to step 310. In step 310 the method checks if the average slope of the return air temperature curve over the last 5 minutes has been less than e.g. 1° C./min to discriminate between phase D and F (see FIG. 2).

If the test in step 310 is no (N) the return air temperature curve is apparently still in phase D (see FIG. 2) and the method therefore reverts to step 303.

If the test in step 310 is yes (Y) the method proceeds to step 312 to terminate the defrost cycle, because the return air temperature curve is in phase F (see FIG. 2) and substantially all frost has melted off the return air grid.

As frost formation on components higher than the evaporator 16 is rare, it would be a waste of energy to let every defrosting cycle last until predefined indicators meet predetermined conditions, indicating that the return air grid 42 is free of frost and/or ice. Usually it would be fine to apply an 'evaporator defrost', i.e. to just terminate a defrosting cycle according to existing standard procedures when the evaporator 16 is substantially free of frost, i.e. ±at the end of phase A in FIG. 2. Hence, there is a need for a defrost termination type controller, that decides whether to apply a "return air grid defrost" or an "evaporator defrost" or anything in-between. This can be controlled manually, e.g. through the unit controller's keypad, by letting a human operator set an input flag to the controller. This defrost termination type flag would then have two values: e.g. 'evaporator defrost' and 'return air grid defrost'. If the defrost termination type flag has the value "evaporator defrost" then a defrosting cycle terminates according to current procedures when predefined indicators indicate that the evaporator is substantially free of frost or ice, else a defrosting cycle terminates according to "return air grid" logics, of which one possible embodiment is described in FIG. 3. It is then the responsibility of the operator to decide a priori if during a shipment conditions may be such that frost or ice is formed at the return air grid 42. It would then be natural to automatically reset this defrost termination type flag to its default value "evaporator defrost" when indicators indicate that a new shipment starts, e.g. when a power off period of more than 4 days occurs, which is a traditional indicator in the reefer container industry that a trip has come to an end.

Alternatively an automatic controller decides whether to apply an "evaporator defrost" or a "return air grid defrost". This could be done in multiple ways. One would typically use the prior knowledge that:

1. Return air grid frost or ice may especially form in temperature pull-down situations, i.e. in the first period after power up of a unit, and when moisture load is high, i.e. when there is a frequent need for defrosting.
2. Return air grid may only frost or ice up when the return air temperature is below 0° C.
3. A frosted or iced up return air grid obstructs air flow and hence air flow rate reduces when the grid frosts up.

Figure 4:
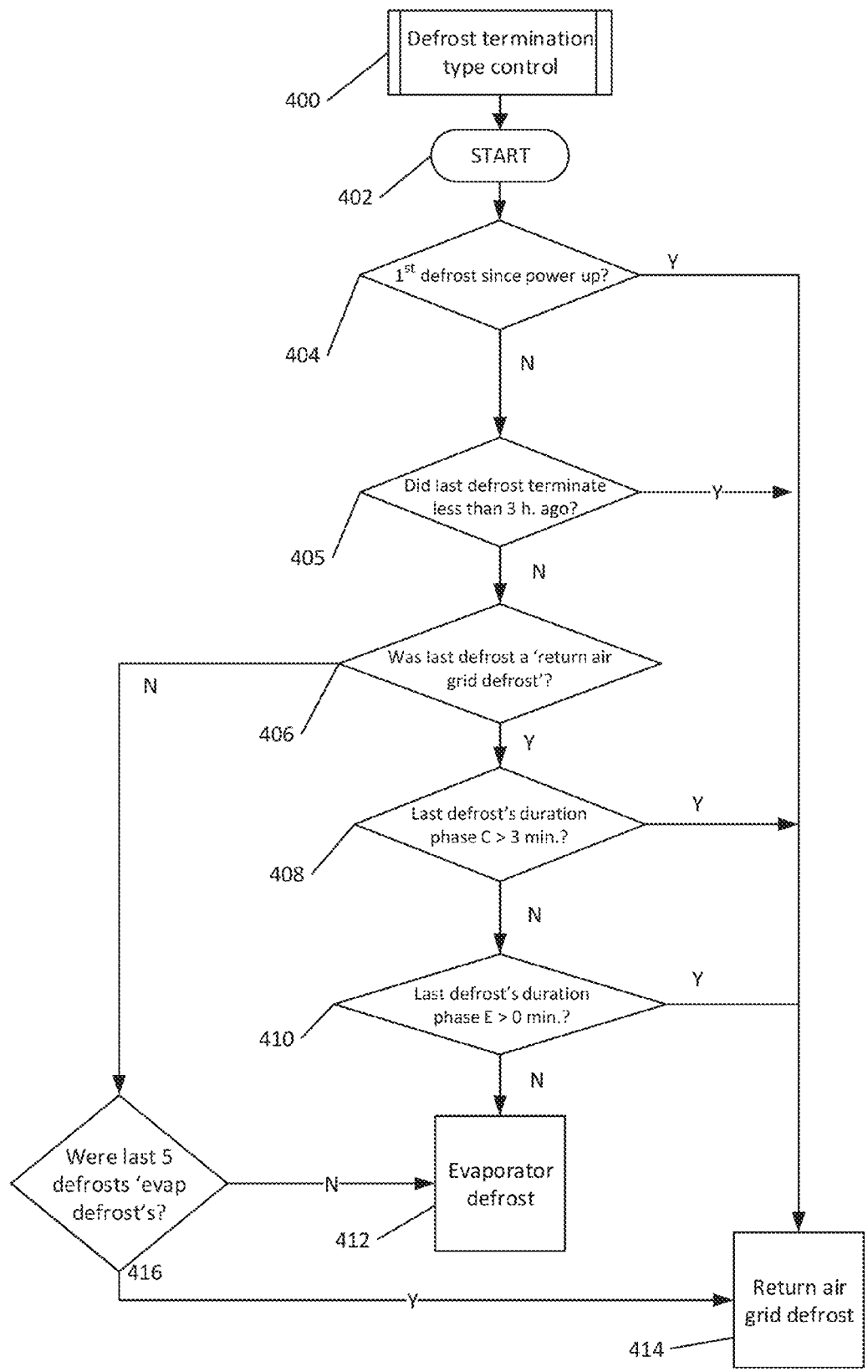
FIG. 4 illustrates a flow chart of a method to automatically control or decide when to apply prior art evaporator defrost termination methods to terminate the defrosting cycle when all frost and/or ice has melted from the evaporator (here called "evaporator defrosts") and when to apply the prolonged or extended defrosting cycle according to the present invention to terminate a defrosting cycle only when substantially all frost and/or ice has melted from the return air grid (here called "return air grid defrosts").

The flow chart shown in FIG. 4 provides one example of the operation of an automatic defrost termination type control algorithm 400, especially relying on above mentioned prior knowledge 1. The procedure would be called right at initiation of a defrost cycle.

The algorithm then starts in step 402 and proceeds to step 404 where it is tested whether the current defrost is the first defrost since the most recent power up of the cooling unit, i.e. whether there is a good chance that the unit operates in a temperature pull-down situation.

If the test in step 404 is yes (Y) the method proceeds to step 414, i.e. it decides to apply a 'return air grid defrost' where it is ensured that the defrosting cycle only terminates when the return air grid is substantially frost free.

In step 414 the defrost termination type "return air grid defrost" may terminate a defrosting cycle according to the logic outlined in the flow chart in FIG. 3.

If the test in step 404 is no (N) the method proceeds to step 405, where it is tested whether the last defrost terminated less than e.g. 3 hours ago, i.e. whether the moisture load is exceptionally high and hence the risk of return air grid frosting is high.

If the test in step 405 is yes (Y) the method proceeds to step 414.

If the test in step 405 is no (N) the method proceeds to step 406, where it is tested whether the last defrost type was a "return air grid defrost".

If the test in step 406 is yes (Y) the method analyses the data collected during this preceding defrosting cycle for signs of frost on the return air temperature sensor and/or return air grid.

The method first proceeds to step 408, where it is tested whether the duration of phase C (see FIG. 2) in the last defrost lasted longer than e.g. 3 minutes.

If the test in step 408 is yes (Y) there was frost or ice at the return air temperature sensor during the previous defrosting cycle and the method proceeds to step 414.

If the test in step 408 is no (N) the direct vicinity of the return air temperature sensor was free of frost at the start of the preceding defrost and the method proceeds to step 410, where it is tested whether phase E (see FIG. 2) was longer than 0 minutes, i.e. whether a period occurred where the slope of the return air temperature curve was negative due to a return air grid opening up.

If the test in step 410 is yes (Y) the return air grid was frosted at the start of the previous defrost and the method decides to again use a defrosting cycle of the type "return air grid defrost" by proceeding to step 414.

If the test in step 410 is no (N) there is no indication that the preceding defrost, which was of the type of the type "return air grid defrost", removed frost from other locations than the evaporator, hence there is no need for a "return air grid defrost" and the method proceeds to step 412.

In step 412 the defrost termination type "evaporator defrost" terminates a defrosting cycle when substantially all frost has melted off the evaporator, using prior art methods. Note that step 412 is only reached when earlier steps in the flow chart indicate that the return air grid is free of frost, and hence a "return air grid defrost" is redundant.

If the test in step 406 is no (N), i.e. the last defrost was an "evaporator defrost", the method proceeds to step 416. In step 416 it is tested whether all last e.g. five defrosting cycles have been terminated according to the defrost termination type "evaporator defrost".

If the test in step 416 is no (N) the method proceeds to step 412, and hence again calls upon a defrost termination type "evaporator defrost".

If the test in step 416 is yes (Y) the method proceeds to step 414, this provides a sort of safety net by ensuring that at least 1 in every e.g. 6 defrosts is only terminated when substantially all frost has melted from a return air grid.

Figure 5:
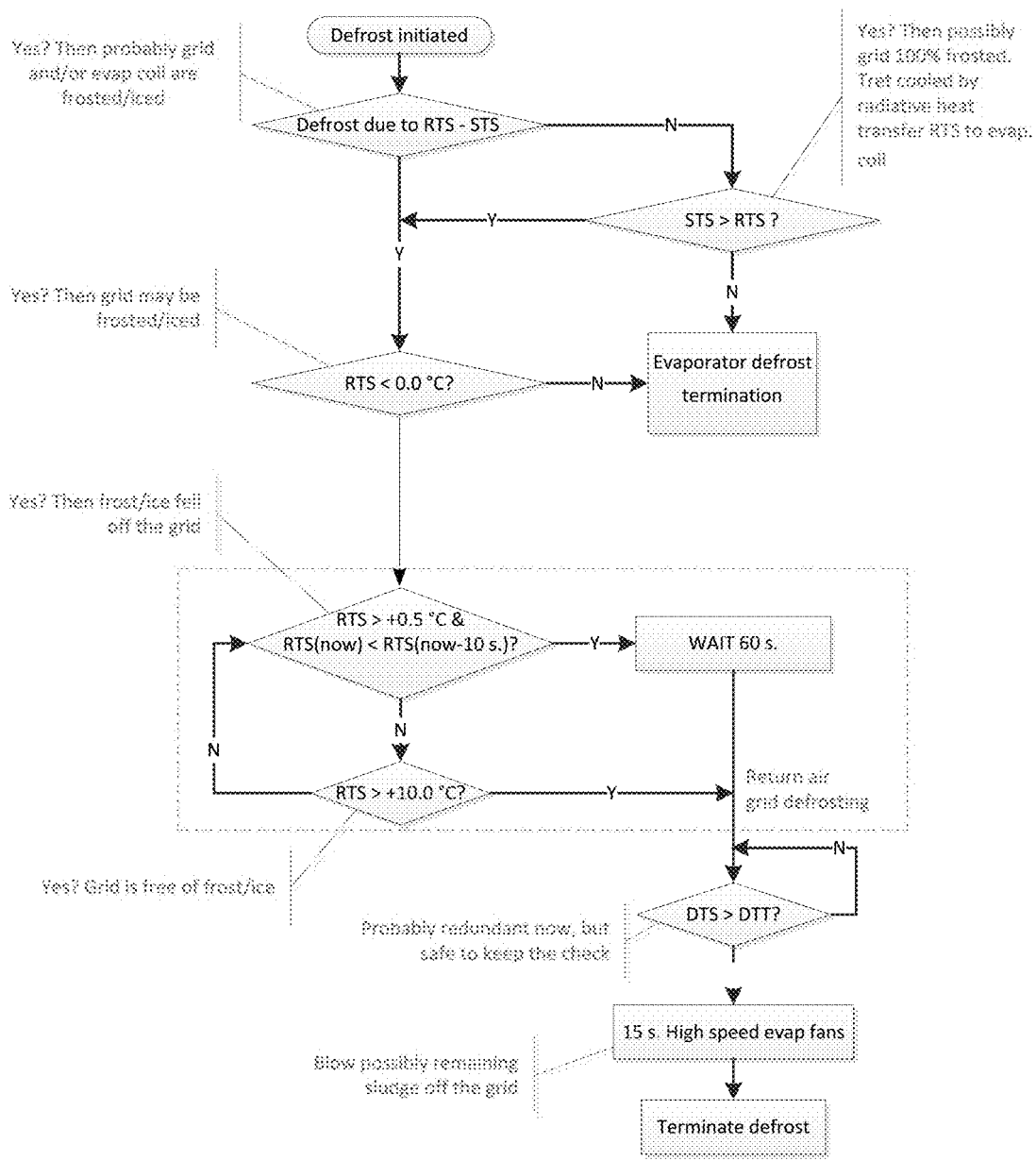
FIG. 5 illustrates a flow chart of an example of the operation of an automatic defrost termination type control algorithm.

The flowchart shown in FIG. 5 provides another example of the operation of an automatic defrost termination type control algorithm; in this case the algorithm is relying more on above mentioned prior knowledge 2 and 3.

The procedure according to FIG. 5 could be called following initiation of a defrosting cycle or an evaporator defrosting cycle.

The algorithm according to FIG. 5, following initiation, initiates by testing whether the current defrosting procedure was initiated following a large temperature difference (Defrost due to RTS-STS) between supply air temperature and return air temperature. If the test is negative (N) the algorithm proceeds to test whether STS (supply air temperature)>RTS (return air temperature). If the test is negative (N), a normal evaporator defrosting cycle is selected. If the STS>RTS test is positive (Y), just as if the initial (Defrost due to RTS-STS) test was positive (Y), the algorithm proceeds to tests whether RTS (return air temperature)<0.0° C. If this test is negative (N), a normal evaporator defrosting cycle is selected. If the RTS<0.0° C. test is positive (Y), an extended or prolonged defrosting cycle is called for.

Upon calling an extended or prolonged defrosting cycle, the algorithm tests whether RTS>+0.5° C. & RTS (now/current)<RTS (now/current-10 s.). If this test is negative (N), the algorithm tests whether RTS>+10.0° C. If this test is negative (N), the algorithm returns to the foregoing test. If the test is positive (Y), as well as if the previous test was positive (Y), the algorithm optionally may proceed to test whether DTS (defrost termination sensor (pos. 17 in FIG. 1))>DTT (defrost termination temperature) If the test is positive (Y), the algorithm may run the evaporator fans in order to blow any frost and/or ice residuals from the return air grid where after the defrosting cycle is terminated.

Other flow charts of the same spirit could achieve comparable results.

According to other aspects of the present invention, a method of choosing between an evaporator defrosting cycle and an extended defrosting cycle within a refrigerated transport container is disclosed. The refrigerated container includes:
  a transport volume 45,
  a cooling unit 40 including at least an evaporator 16 arranged in a cooling space 41,
  a return air grid 42 arranged to separate the cooling space 41 from the transport volume 45,
  means, disposed at a height between the evaporator 16 and the return air grid 42 for sensing return air temperature,
  means for actively heating the evaporator 16 during defrosting cycles, and
  a processor configured for controlling at least the duration of the defrosting cycles,
where the method includes the steps of:
  establishing one or more indicators indicative of frost and/or ice build-up on the return air grid 42, and
  choosing an extended defrosting cycle if one or more indicators indicative of frost and/or ice build-up on the return air grid 42 indicate frost and/or ice build-up on the return air grid 42.

According to some embodiments of any aspect of the present invention, the defrosting cycles may be prolonged or extended only if the current set point of the cooling unit is equal to the set point of the cooling unit prior to initiation of the past defrost cycle.

According to some embodiments of any aspect of the present invention, one indicator indicative of frost and/or ice build-up on the return air grid 42 may be established by the time elapsed between defrost initiation and a return air temperature rise above 0° C. (end of phase C in FIG. 2).

The teaching of this invention has numerous advantages. Different embodiments or implementations may yield one or more of the specified advantages. It should be noted that this specification may not be considered an exhaustive list and there may be other advantages, which are not described herein.

Although the teaching of this application has been described in detail for purpose of illustration, it is understood that such detail is solely for that purpose, and variations can be made therein by those skilled in the art without departing from the scope of the teaching of this application.

The terms "comprising" and/or "including" as used in the description as well as in the appended claims does not exclude other elements or steps. The term "a" or "an" as used in the claims furthermore does not exclude a plurality.

The invention claimed is:

1. A method of terminating a defrosting cycle within a refrigerated transport container, the container includes:
   a transport volume,
   a cooling unit comprising at least an evaporator arranged in a cooling space,
   a return air grid arranged to separate said cooling space from said transport volume,
   means for sensing temperature indicative of the return air temperature of air returning to said cooling space from said transport volume or the temperature of the return air grid,
   means for actively heating said evaporator during defrosting cycles, and
   a processor configured for controlling at least the duration of said defrosting cycles, wherein the method comprises:
   establishing one or more indicators indicative of at least one of frost or ice build-up on said return air grid, and
   terminating a defrosting cycle only when said one or more indicators indicative of the at least one of frost or ice build-up on said return air grid indicate that said return air grid is free of the at least one of frost or ice.

2. The method according to claim 1, wherein said step of terminating a defrosting cycle constitutes prolongation of an evaporator defrosting cycle.

3. The method according to claim 1, wherein said step of terminating a defrosting cycle constitutes selection of either an evaporator defrosting cycle or an extended defrosting cycle.

4. The method according to claim 1, wherein the method of terminating a defrosting cycle constitutes a method of terminating a current defrosting cycle.

5. The method according to claim 1, wherein said means for sensing temperature indicative of the return air temperature or the temperature of the return air grid includes means disposed inside said cooling space at a height between said evaporator and said return air grid.

6. The method according to claim 5, wherein said means includes a return air temperature sensor disposed at least one of on or downstream said return air grid or on or upstream said evaporator.

7. The method according to claim 1, wherein said one or more indicators indicative of the at least one of frost or ice build-up on said return air grid includes detection of return air temperature below 0° C. at the start of a defrosting cycle or during the hour before start of defrosting cycle or during a defrosting cycle.

8. The method according to claim 1, wherein said one or more indicators indicative of the at least one of frost or ice build-up on said return air grid includes detection of reduced air flow rate through said cooling space at the start of a defrosting cycle or during the hour before start of defrosting cycle.

9. The method according to claim 8, wherein said reduced air flow rate through said cooling space is detected by the detection of a difference between the sensed return air temperature and sensed supply air temperature being larger than expected based on the delivered cooling capacity at the start of a defrosting cycle or during the hour before start of defrosting cycle.

10. The method according to claim 1, wherein said one or more indicators indicative of the at least one of frost or ice build-up on said return air grid includes detection of the supply air temperature being warmer than the return air temperature during cooling operation at, or during the hour before, the start of a defrosting cycle.

11. The method according to claim 1, wherein said one or more indicators indicative of the at least one of frost or ice build-up on said return air grid includes detection of frequent need for defrosting.

12. The method according to claim 1, wherein said return air grid is arranged in an upper portion of a bulkhead disposed in-between said transport volume and said cooling space.

13. The method according to claim 1, wherein one indicator indicative of the at least one of frost or ice build-up on said return air grid is detection of, during a defrost cycle, a return air temperature rise distinctly faster from −1° C. to +3° C. than during the preceding defrosting cycle.

14. The method according to claim 1, wherein one indicator indicative of the at least one of frost or ice build-up on said return air grid is established by a return air temperature decrease following a return air temperature rise above 0° C., occurring during a defrosting cycle while heating capacity supplied to said evaporator does not decrease.

15. The method according to claim 1, wherein one indicator indicative of the at least one of frost or ice build-up on said return air grid is time elapsed since start of defrost.

16. The method according to claim 1, wherein the method is configured such that indication of the at least one of frost or ice build-up on said return air grid is possible only in modes of operation wherein the return air temperature is below 0° C.

17. The method according to claim 1, wherein the container cooling unit further includes an evaporator fan disposed downstream said return air grid and upstream said evaporator and wherein said evaporator fan, during defrosting cycles, is off.

18. The method according to claim 17, wherein said method further includes a step of, following a defrosting cycle wherein indication of the at least one of frost or ice build-up on said return air grid was given, running the evaporator fan, in either normal or reverse direction, for a predetermined period of time in order to blow at least one of water, partially melted frost or ice off from said return air grid.

19. A device for terminating a defrosting cycle within a refrigerated transport container, wherein said device is configured to operate in accordance with the method according to claim 1.

20. A computer program on a data carrying means, a computer program product or a non-transitory computer-readable storage medium having computer executable instructions, wherein the computer executable instructions, when executed by one or more computer processors, cause the one or more computer processors to provide a method of terminating a defrosting cycle within a refrigerated transport container in accordance with claim 1.

* * * * *